United States Patent [19]

Melvin, Jr.

[11] 4,357,598
[45] Nov. 2, 1982

[54] THREE-PHASE POWER DISTRIBUTION NETWORK COMMUNICATION SYSTEM

[75] Inventor: Waymon A. Melvin, Jr., St. Mathews Township, Wake County, N.C.

[73] Assignee: Westinghouse Electric Corp., Pittsburgh, Pa.

[21] Appl. No.: 252,681

[22] Filed: Apr. 9, 1981

[51] Int. Cl.³ .............................................. H04B 3/56
[52] U.S. Cl. .................................. 340/310 A; 375/4; 340/825.01
[58] Field of Search ........ 340/310 A, 310 R, 310 CP, 340/870.03, 825.01, 825.03; 375/4, 38; 329/104; 333/173–176, 1, 24 R; 364/483

[56] References Cited

U.S. PATENT DOCUMENTS

| | | | |
|---|---|---|---|
| 4,065,763 | 12/1977 | Whyte et al. | 340/310 R |
| 4,159,470 | 6/1979 | Strojny et al. | 340/825.01 |
| 4,188,619 | 2/1980 | Perkins | 340/310 R |
| 4,276,605 | 6/1981 | Okamoto et al. | 364/483 |

Primary Examiner—Donald J. Yusko
Attorney, Agent, or Firm—Robert E. Converse, Jr.

[57] ABSTRACT

A communication system for a three-phase power distribution network is comprised of a plurality of remote devices, with certain of the remote devices being used as signal repeaters. Injection point circuitry provides an out-going communication signal which is coupled to the three-phase conductors such that each phase conductor carries an identical, independent, outgoing communication signal. The signal repeaters are each coupled to at least two of the three-phase conductors. Each signal repeater includes circuitry for producing a composite signal in response to the coupled signals. The composite signal has a signal-to-noise ratio typically superior to, but not worse than, the signal-to-noise ratio of the best of the coupled signals. The remainder of the remote devices are independently coupled to at least one of the three-phase conductors so as to facilitate communication with each of the remote devices.

12 Claims, 1 Drawing Figure

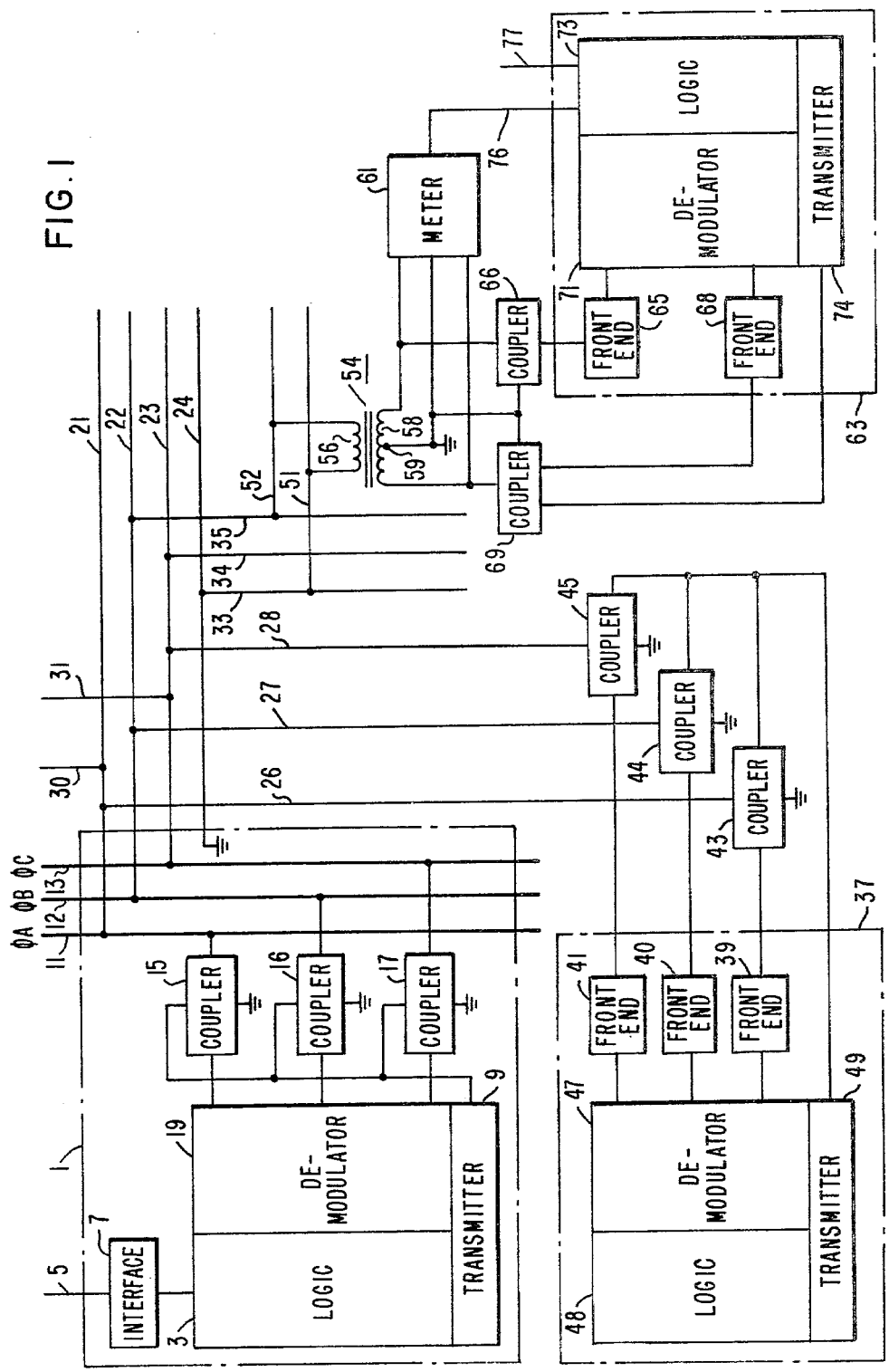

THREE-PHASE POWER DISTRIBUTION NETWORK COMMUNICATION SYSTEM

BACKGROUND OF THE INVENTION

1. Field of the Invention

This invention relates in general to power line carrier communication systems, and more specifically, to power line carrier communication systems which utilize a utility power distribution network for communication.

2. Description of the Prior Art

A power distribution network is polyphase in design and requires multi-conductors. The distribution primary is that portion of the distribution system between the distribution substation and the distribution transformer. Typically, the primary side of the distribution system is a three-phase network consisting of three or four conductors. The secondary side of the distribution system is that portion of the system between the primary feeders and the consumer's premises. The secondary side of the distribution system can be either single-phase or polyphase. In either case, the secondary side will typically consist of multi-conductor, two or three-phase service. The power distribution network is designed for the efficient transfer of power at fifty or sixty hertz. While this type of system works well for the distribution of power at power line frequencies, it presents severe problems when used as a communication system.

One problem associated with using the power distribution network as a communication system stems from the fact that the power distribution network is designed to transmit fifty or sixty hertz signals while the carrier communication signal is typically 5 kilohertz to 100 kilohertz. These high frequency communication signals experience extreme attenuation when impressed upon a power line conductor designed for lower frequency signals. Also, the power distribution network is an extremely noisy environment and suffers from large numbers of transients due to the switching on and off of user loads. The switching on and off of user loads may even change the characteristics of the power line conductor, thus effecting the rate of propagation of the carrier communication signal.

One prior art solution is to impress the carrier communication signal upon the phase conductor having the most favorable propagation characteristics. As the characteristics of the phase conductors change with the addition and removal of user loads, the phase conductor to which the carrier communication signal is impressed will also change. However, this presents bookkeeping problems in that each device which the user intends to communicate with must be switched to the proper phase conductor so as to receive the communication signal.

Another prior art solution is to impress the communication signal upon all of the three-phase conductors. Two different methods of impressing the communication signal on each of the three-phase conductors are disclosed in U.S. Pat. Nos. 4,065,763 and 4,188,619. By impressing the communication signal upon each of the three-phase conductors, the bookkeeping problem encountered in the prior art technique discussed above is eliminated.

In U.S. Pat. No. 4,065,763, an impedance matching transformer having multiple secondary taps is used for coupling the communication signal to each of the three-phase conductors. While such a scheme provides an inexpensive method of coupling the communication signal, it suffers from having to use the same magnetic material, i.e., the core of the impedance matching transformer, to couple all three communication signals. When coupling the communication signal to the power distribution network, any noise associated with the signal is coupled to each of the three-phase conductors. When removing the communication signals from the power distribution network, the communication signals will have slightly different phases due to the different propagation rates of each of the three-phase conductors. By using a single magnetic core to remove the communication signals from the power distribution network, the communication signals themselves will subtract because of the phase differences while the noise will add. Thus, the signal utilized by the receiving device will never be better than the best of the received signals, and will typically be worse.

U.S. Pat. No. 4,188,619 also discloses a method of impressing a communication signal upon each of the three-phase conductors. This method involves the use of a three-phase transformer or, in the alternative, three single-phase transformers. Although this method eliminates the burden placed upon the magnetic material, i.e., the cores of the transformers, the connection of the transformers presents substantially the same problem. That is, any noise associated with the communication signal will be coupled to each of the three-phase conductors. When removing the communication signal from each of the three-phase conductors, the communication signals will subtract while the noise associated with each signal will add. Thus, the signal utilized by the received device will never be better than the best of the received signals, and will typically be worse.

The present invention is for a three-phase power distribution network communication system wherein the signal utilized by the receiving device is typically better than, or equal to in a worst case analysis, the best of the received communication signals.

SUMMARY OF THE INVENTION

A communication system for a three-phase power distribution network comprised of a plurality of three-phase power line conductors is disclosed. The communication system is comprised of a plurality of remote devices which the user can communicate with. These remote devices may be signal repeaters, equipment located at customer sites for servicing the customer site, or equipment remote from customer sites for serving groups of customer sites. An injection point circuit provides an outgoing communication signal which is intended for at least one of the remote devices. The injection point circuitry is coupled to the three-phase conductors such that each phase conductor carries an independent, identical, outgoing communication signal. The injection point circuitry is located at a convenient injection point, such as a substation, on the power distribution network. The injection point circuitry typically provides the outgoing communication signal in response to an outgoing communication signal produced by a central computer. The central computer is typically linked to the injection point circuit by a phone link and various interface devices. The central station computer and phone link are not a part of the present invention.

Three independent couplers are used to couple each of the three-phase power line conductors to the injection point circuit. In this manner, each of the three-phase power line conductors carries an independent, identical, outgoing communication signal.

Each of the remote devices is independently coupled to at least one of the three-phase power line conductors. When a remote device, such as a signal repeater, is coupled to more than one three-phase power line conductor, the remote device receives more than one of the outgoing communication signals. These signals are independently reconstructed. A circuit is provided which allows the remote device to produce a composite signal in response to the received outgoing communication signals. The composite signal has a signal-to-noise ratio which is typically superior to the signal-to-noise ratio of the best of the received signals, and which will be at least equal to the signal-to-noise ratio of the best of the received signals in a worst case analysis.

BRIEF DESCRIPTION OF THE DRAWING

FIG. 1 illustrates a small portion of a three-phase power distribution network communication system constructed according to the teachings of the present invention.

DESCRIPTION OF THE PREFERRED EMBODIMENT

Referring to FIG. 1, a small portion of a three-phase power distribution network communication system constructed according to the teachings of the present invention is shown. The following explanation of the communication system illustrated in FIG. 1 is not intended to be an exhaustive explanation of a power distribution network communication system. The explanation accompanying FIG. 1 is intended to describe the present invention and the benefits that flow therefrom. Readers wishing a more detailed discussion of a power distribution network communication system should refer to U.S. Patent Application Ser. No. 252,682 filed Apr. 9, 1981 which is hereby incorporated by reference.

In FIG. 1, an injection point circuit 1 for providing three, identical, independent outgoing communication signals intended for at least one remote device is shown in the upper left-hand corner. The circuit a may be located at any convenient injection point such as a substation. The outgoing communication signal is originally produced by a central computer (not shown) and delivered to a logic circuit 3 through a phone line 5 and an interface 7. The production of the original outgoing communication signal and the delivery of that signal to the circuit 1 are not important features of the present invention. The logic circuit 3 provides an outgoing communication signal having a format compatible with the power distribution network in response to the communication signal generated by the central computer.

A transmitter 9 is responsive to the logic circuit 3. The transmitter 9 is connected to a substation bus comprised of a phase A conductor 11, a phase B conductor 12 and a phase C conductor 13 through three independent couplers 15, 16 and 17, respectively. The transmitter 9 is connected to the substation bus conductors 11, 12 and 13 through the couplers 15, 16 and 17 such that each of the three-phase substation bus conductors carries an identical, phase-related independent, outgoing communication signal. In this manner, the injection point circuitry 1 provides three, identical, independent outgoing communication signals intended for at least one remote device.

Since the injection point circuitry 1 is also used to receive incoming communication signals, the couplers 15, 16 and 17 are connected to a demodulator 19. The demodulator 19 is used to independently reconstruct the received incoming communication signals. The logic circuit 3 produces a composite signal in response to the received incoming communication signals.

The three-phase power distribution network shown in FIG. 1 is comprised of a plurality of power line conductors. These power line conductors interconnect the remote devices of the communication system. These remote devices may be various kinds of equipment such as signal repeaters, load management devices located at a customer site or load management devices located remote from a customer site for servicing several customer sites. The reader should recognize that even though only two remote devices are shown in FIG. 1, an actual distribution network communication system services hundreds of remote devices. Additionally, these remote devices need not be limited to those enumerated above.

In FIG. 1, a phase A distribution primary feeder 21 is connected to the phase A substation bus conductor 11. A phase B distribution primary feeder 22 is connected to the phase B substation bus conductor 12; a phase C distribution primary feeder 23 is connected to the phase C substation bus conductor 13. The distribution primary feeder also has a neutral or ground conductor 24. Service to remote devices from the distribution primary feeder may take on a variety of forms such as three-phase service, represented by conductors 26, 27 and 28, two-phase service, as represented by conductors 30 and 31, two-phase to ground service, as represented by conductors 33, 34 and 35, or other combinations. The conductors 26, 27 and 28 provide three phase service to a remote device 37 which is a signal repeater.

The signal repeater 37 has three receiver front ends 39, 40 and 41 connected to the conductors 26, 27 and 28 through a first coupler 43, a second coupler 44 and a third coupler 45, respectively. The signal repeater 37 is thus able to receive each of the three outgoing communication signals. The receiver front ends 39, 40 and 41 are connected to a demodulator 47. The demodulator 47 functions in a similar fashion to the demodulator 19 in that it independently reconstructs the received signals. A logic circuit 48 produces a composite signal from the three received signals. The composite signal is produced by examining various portions of the received signal and selecting those portions having the best signal-to-noise ratio for use in the composite signal. The selected portions are digitally combined to produce the composite signal. The signal-to-noise ratio of the composite signal is therefore at least equal to the signal-to-noise ratio of the best of the three received outgoing communication signals, and will typically be superior to the signal-to-noise ratio of the best of the three received outgoing communication signals. The operation of the demodulator 47 and logic circuit 48 are described in detailed in U.S. Patent Application Ser. No. 77,824 filed Sept. 21, 1979 and now U.S. Pat. No. 4,311,964 and are not considered to be important features of the present invention.

The signal repeater 37 is responsive to the composite signal. One response is to transmit the composite signal which is carried out by a transmitter 49. The transmitter 49 is connected to the conductors 26, 27 and 28 through the couplers 43, 44 and 45 such that each conductor carries an identical, independent composite communication signal. Additional signal repeaters downstream from signal repeater 37 will respond to the three composite communication signals in the same manner that the signal repeater 37 responds to the three, independent out-going communication signals.

The conductors 33 and 35 are connected to conductors 51 and 52, respectively, such that the conductors 51 and 52 provide phase-to-ground service to customer sites. Since the outgoing communication signal is coupled to each of the three-phase conductors, a customer device serviced by only one phase conductor will receive at least one of the three out-going communication signals.

A step-down transformer 54 has a primary winding 56 connected across the conductors 51 and 52. By way of illustration and not limitation, a meter 61 is connected across a secondary winding 58 of the transformer 54. The secondary winding 58 has a center tap 59 connected to ground. A remote device 63 is a load management device. The load management device 63 has a first receiver front end 65 coupled across one lead of the secondary winding 58 and ground through a coupler 66. The load management device 63 has a second receiver front end 68 coupled across the other lead of the secondary winding 58 and ground through a coupler 69. A demodulator 71, similar to the demodulator 47, is responsive to the receiver front ends 65 and 68. A logic circuit 73, responsive to the demodulator 71, produces a composite signal in response to the signals coupled by the first and second couplers 66 and 69. The composite signal has a signal-to-noise ratio at least equal to, and typically superior to, the signal-to-noise ratio of the best of the coupled signals.

The logic circuit 73 of the load management terminal 63 is responsive to the composite communication signal. The response to the composite communication signal may take a variety of forms. One response, is to interrogate the meter 61 as shown by the conductor 76. Another response is to shed loads (not shown) as illustrated by the conductor 77. A still further response is to produce an incoming communication signal. This incoming communication signal is input to a transmitter 74. The transmitter 74 is coupled to the secondary winding 58 of the transformer 54 through the second coupler 69. The incoming communication signal is intended for the central computer.

Returning to the injection point circuitry 1, when an incoming communication signal has been impressed on each of the three-phase conductors by a remote device receiving three-phase service, the couplers 15, 16 and 17 cooperate with the demodulator 19 to produce three received signals. The logic circuit 3 produces a composite signal from the three received signals which has a signal-to-noise ratio which is at least equal to, and typically superior to, the signal-to-noise ratio of the best of the received signals. The logic circuit 3 translates the composite signal to a format compatible with the phone line 5 such that the composite signal is delivered to the central computer.

What is claimed is:

1. A communication system for a three-phase power distribution network, comprising:
a plurality of remote devices, certain of said remote devices being signal repeaters;
means for providing an outgoing communication signal intended for at least one of said remote devices;
a plurality of interconnected three-phase power line conductors;
first means for independently coupling certain of said three-phase conductors to said means for providing said outgoing communication signal such that each phase conductor carries an identical phase-related outgoing communication signal;
second means for independently coupling at least two of said three-phase conductors to each of said signal repeaters;
and wherein each of said signal repeaters includes means for producing a composite signal in response to the coupled signals, and includes means responsive to said composite signal, and
third means for independently coupling at least one of said three-phase conductors to each of said other remote devices.

2. The communication system of claim 1 wherein the composite signal has an improved signal-to-noise ratio.

3. The communication system of claim 1 wherein the second means for independently coupling includes means for coupling each of the three-phase conductors to each of said signal repeaters such that each of said signal repeaters receives three coupled signals.

4. The communication system of claim 3 wherein the means responsive to the composite signal includes means for transmitting said composite signal, and wherein the second means for independently coupling couples the three-phase conductors to said means for transmitting such that each phase conductor carries an identical composite signal.

5. The communication system of claim 3 wherein the means for producing the composite signal includes means for digitally combining those portions of the three coupled signals having the greatest signal-to-noise ratio such that the signal-to-noise ratio of said composite signal is at least equal to the signal-to-noise ratio of the best of said three coupled signals.

6. The communication system of claim 1 wherein the plurality of remote devices includes equipment located at customer sites for servicing said customer sites.

7. The communication system of claim 1 wherein the plurality of remote devices includes equipment located remote from customer sites for servicing groups of said customer sites.

8. The communication system of claim 1 including a neutral conductor, and including a plurality of transformers connected between one of the three-phase power line conductors and said neutral conductor, said transformers each servicing at least one remote device.

9. The communication system of claim 8 wherein each transformer has a center taped secondary winding, and wherein the third means for independently coupling includes fourth means for independently coupling the at least one remote device between one secondary lead and said center tap, and includes fifth means for independently coupling said at least one remote device between the other secondary lead and said center tap.

10. The communication system of claim 9 wherein each of the remote devices includes means for producing a composite signal in response to the fourth and fifth means for independently coupling, said composite signal having an improved signal-to-noise ratio, and includes means responsive to said composite signal.

11. The communication system of claim 1 wherein each of the remote devices includes means for producing an incoming communication signal, and includes means for transmitting said incoming communication signal.

12. The communication system of claim 11 wherein the means for providing the outgoing communication signal includes means for producing a composite signal having an improved signal-to-noise ratio in response to the coupled signals.

* * * * *